(12) United States Patent
Daring

(10) Patent No.: US 9,930,985 B2
(45) Date of Patent: Apr. 3, 2018

(54) MAGNETIC PURSE HANGER

(71) Applicant: Kelley Ann Daring, Sacramento, CA (US)

(72) Inventor: Kelley Ann Daring, Sacramento, CA (US)

(73) Assignee: Kelley Daring, Sacramento, CA (US)

( * ) Notice: Subject to any disclaimer, the term of this patent is extended or adjusted under 35 U.S.C. 154(b) by 15 days.

(21) Appl. No.: 14/616,238

(22) Filed: Feb. 6, 2015

(65) Prior Publication Data

US 2016/0227952 A1    Aug. 11, 2016

(51) Int. Cl.
A47G 29/08 (2006.01)
A44B 15/00 (2006.01)
F16B 45/02 (2006.01)
F16B 1/00 (2006.01)

(52) U.S. Cl.
CPC ............ *A47G 29/083* (2013.01); *A44B 15/00* (2013.01); *A47G 2200/106* (2013.01); *F16B 45/02* (2013.01); *F16B 2001/0035* (2013.01)

(58) Field of Classification Search
CPC ...... A47G 29/083; A47G 29/08; A44B 15/00; F16B 1/00; F16B 45/02

USPC ................... 40/661.01; 70/456 R; 248/206.5
See application file for complete search history.

(56) References Cited

U.S. PATENT DOCUMENTS

| | | | | |
|---|---|---|---|---|
| 1,373,867 | A * | 4/1921 | Conner | 211/4 |
| 4,940,250 | A * | 7/1990 | Corrado | A45C 13/023 206/37.1 |
| 5,388,439 | A * | 2/1995 | Miller | A44B 15/005 206/37.1 |
| 6,098,327 | A * | 8/2000 | Gallant | A44B 15/00 40/600 |
| 7,644,900 | B2 * | 1/2010 | Yap | A47G 29/083 223/120 |
| D737,566 | S * | 9/2015 | Gaddis | D3/208 |
| 2010/0102182 | A1 * | 4/2010 | Lin | G06F 1/1607 248/206.5 |
| 2014/0000138 | A1 * | 1/2014 | Cable | G09F 3/14 40/661.01 |
| 2015/0108301 | A1 * | 4/2015 | Troy | F16M 13/022 248/206.5 |

* cited by examiner

*Primary Examiner* — William Gilbert

(57) ABSTRACT

An article for magnetically attaching a purse to a vertical magnetized surface such as a public restroom stall partition. The article includes enclosed magnet(s) joined to a clasp or ring, which is removably attached to a purse strap or purse hardware. Once attached to the purse, the article may be removably adhered to a magnetized surface.

2 Claims, 3 Drawing Sheets

MAGNETIC PURSE HANGER

CROSS-REFERENCE TO RELATED APPLICATIONS

N/A

STATEMENT REGARDING FEDERALLY SPONSORED RESEARCH OR DEVELOPMENT

N/A

REFERENCE TO SEQUENCE LISTING, A TABLE, OR A COMPUTER PROGRAM LISTING COMPACT DISC APPENDIX

N/A

BACKGROUND OF THE INVENTION

Field of the Invention

The present invention relates generally to hanging accessories, and more particularly to a portable hanger for hanging a purse from a table.

Description of the Related Art

A well-known and common predicament for people who use purses, purse-like bags, and small personal items is the dilemma of what to do with the item while seated at a table.

In response to this dilemma, the approach most commonly taken to providing purse hangers is a portable hanger which includes a base having a generally planar bottom surface and a perimeter. The bottom surface is adapted to rest upon and frictionally engage a table or horizontal surface as seen in U.S. Pat. No. 7,644,900 issued in 2006 to Yap. For smaller personal items such as keys, U.S. Pat. No. 5,388,439 issued in 1995 to Miller embodies a magnetic key fob for use on magnetized surfaces.

The prior art suffers from at least three disadvantages. Firstly, some of the prior art does not attach to the surface of a vertical plane. Secondly, prior art that can attach to the surface of a vertical plane does not provide a solution for hanging items heavier than a personal set of keys. Thirdly, prior art does not embody aesthetics, design, or composition for semi-permanent use on the exterior of a personal item.

BRIEF SUMMARY OF THE PRESENT INVENTION

In view of the foregoing disadvantages inherent in the known types of article securing devices now present in the prior art, the present invention provides a new system for securing personal items to horizontal and vertical surfaces having magnetic properties.

The present invention in one embodiment generally comprises an assembly for securing at least one personal item to a surface, leaving the user's hands free and said personal item off the ground. One embodiment of the assembly comprises one or more magnets within a fabric encasement, which connects to a detachable clasp. The detachable clasp is clipped to the user's personal item and can then be adhered to a magnetized surface.

The present embodiment offers a plurality of advantages. Firstly, it allows the user to hang personal items of substantial weight from a vertical magnetized surface such as a bathroom stall partition. Secondly, it removably attaches to the interior or exterior of said personal items making it readily and immediately available to the user. Thirdly, the design and composition of the assembly makes it suitable for use as a decorative accessory on the exterior of said personal items.

There has thus been outlined, rather broadly, the more important features of the present embodiment in order that the detailed description thereof that follows may be better understood, and in order that the present contribution to the art may be better appreciated. There are additional features of the invention that will be described hereinafter and which will form the subject matter of the claims appended hereto.

BRIEF DESCRIPTION OF THE DRAWINGS

The present embodiment of the invention will become more fully understood by reference to the following detailed description of the present embodiment when read in conjunction with the accompanying drawings, in which like reference characters refer to like parts throughout the views, and in which.

DETAILED DESCRIPTION OF SPECIFIC EMBODIMENTS OF THE PRESENT INVENTION

The drawings disclose the present embodiments of the present invention. While the configuration according to the illustrated embodiments are presently preferred, it is envisioned that alternate configurations of the present embodiment may be adopted without deviating from the invention as portrayed. The present embodiments are discussed hereafter.

Figure 1:
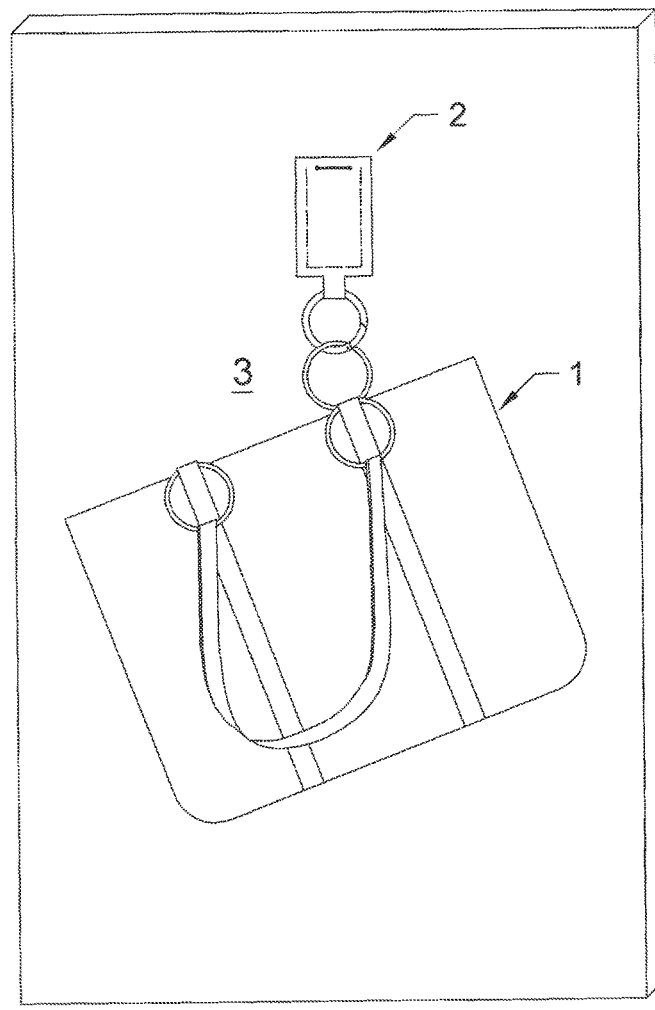
FIG. 1 is an elevation view illustrating the magnetic purse hanger assembly in use on a vertical surface.

Referring to FIG. 1, a personal bag 1 is shown in elevation whereby a magnetic purse hanger assembly 2 is illustrated magnetically holding the personal bag 1 to a surface of a metal vertical plane 3. While the personal bag 1 is the suggested personal item for the magnetic purse hanger assembly 2, other items such as clothing, bags, backpacks, shopping bags, satchels, and the like may be preferred. In any event, regardless of the personal item, the magnetic purse holder assembly 2 is fitted and operates the same.

Figure 2:
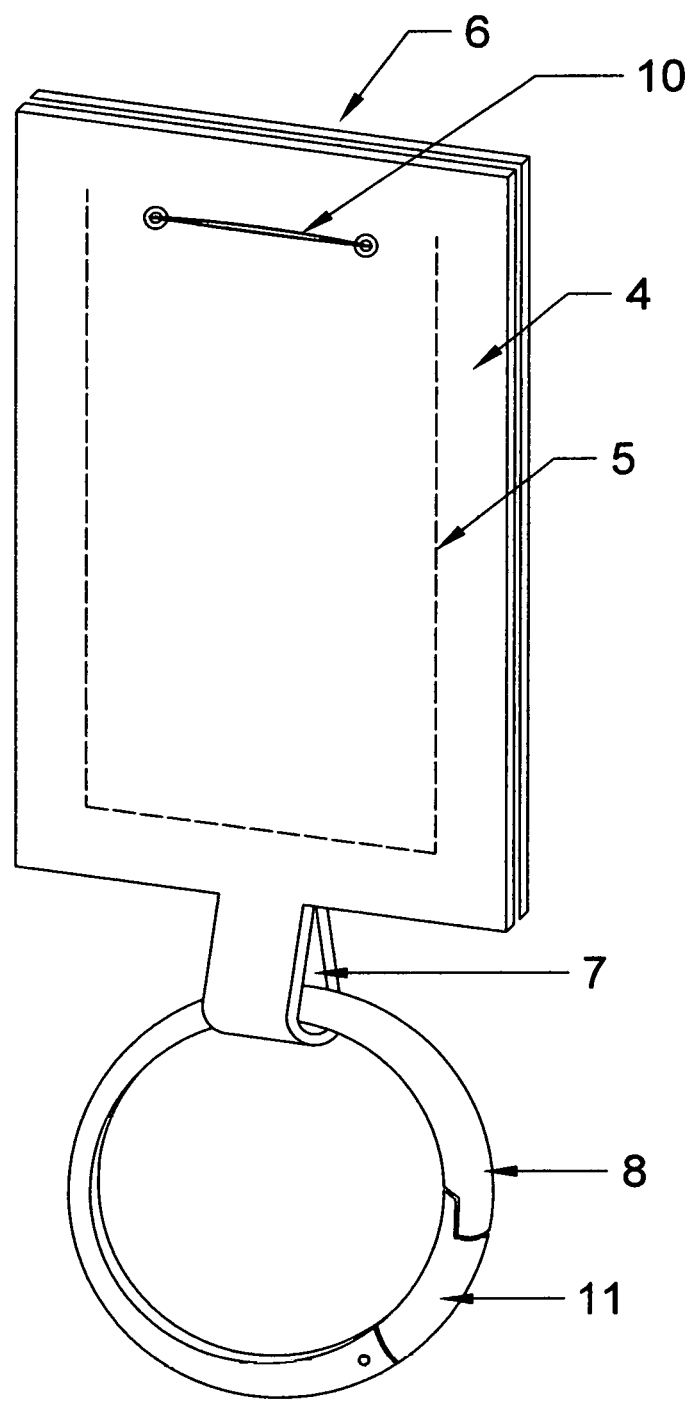
FIG. 2 is a perspective view illustrating the exterior details of the magnetic purse hanger assembly.
Figure 3:
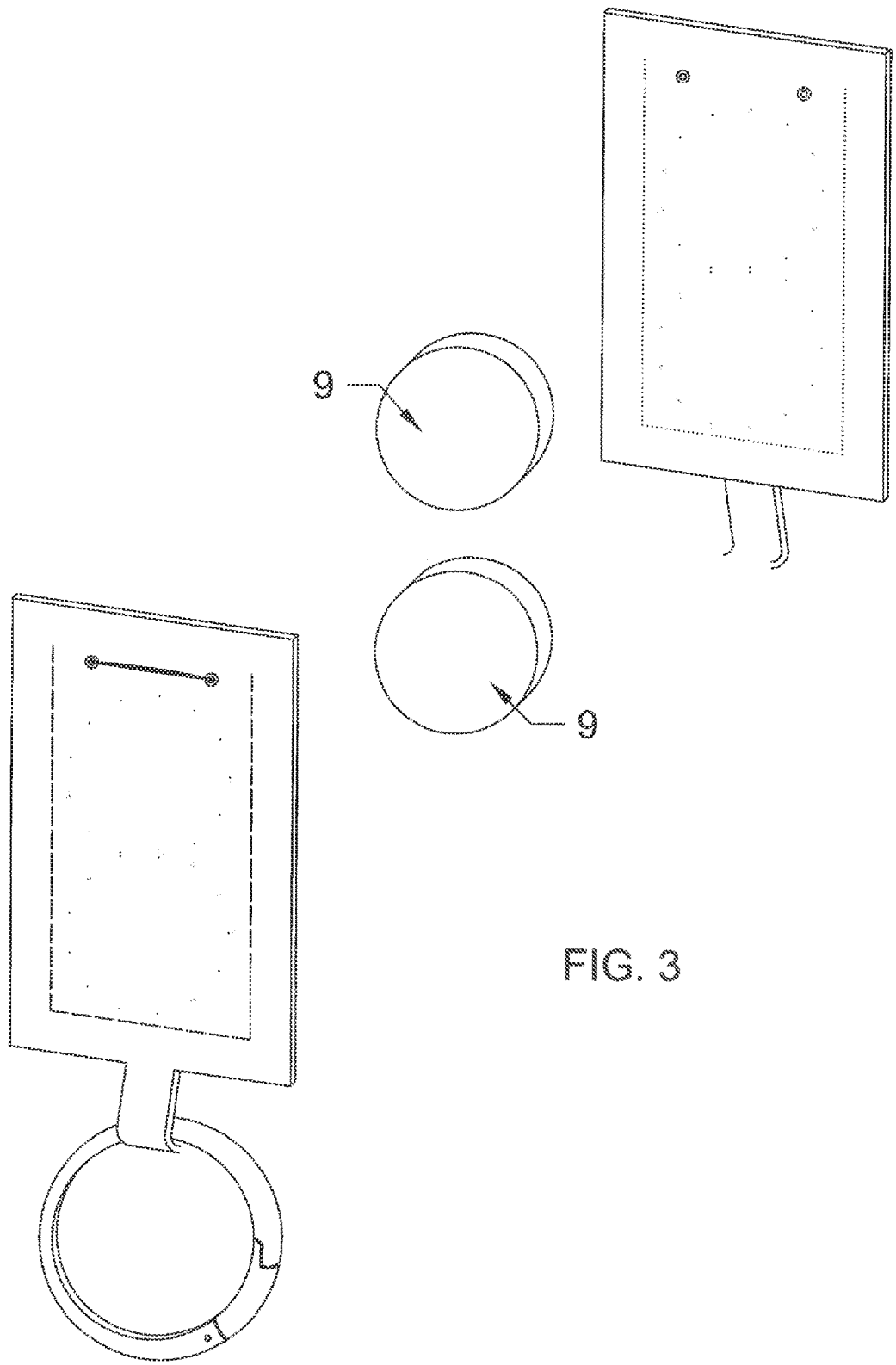
FIG. 3 is an exploded view that allows illustration of the interior components of the magnetic purse hanger assembly.

Referring to FIG. 2, a flexible pouch 4 encapsulates two magnets 9 as seen in FIG. 3. This embodiment illustrates the pouch 4 as a polyurethane faced, polyester backed fabric although other materials including but not limited to other textiles, plastic coating, or materials may be used. This embodiment illustrates the pouch 4 as being rectangular although other shapes may be used such as round or oval. Machine or hand stitching 5 binds the pouch 4 together on three sides, leaving an open end 6, for insertion of magnets 9. Open end 6 is machine or hand-stitched closed after insertion of magnets, the present embodiment illustrates hand stitching 10. Opposite the open end 6 is a loop 7. In this embodiment the loop 7 is integral to the pouch 4 and is composed of the same material as the pouch 4. From the loop 7 a ring 8 is inserted through the loop 7 for attachment to the personal bag 1 of FIG. 1, or other personal items. In this embodiment the ring 8 is an articulating O-ring capable of opening and closing, but other articulating or non-articulating assemblies including swivel snap hooks or clasps can be used.

Referring to FIG. 3 an exploded view is illustrated detailing the interior components consisting of the two magnets 9. The present embodiment of the illustrated magnets 9 are two rigid N50 neodymium discs but the size, shape, quantity, type, and strength may be different and may include square or rectangular shapes. The magnets 9 may also be flexible rather than rigid.

Variations or modifications to the subject matter of this invention may occur to those skilled in the art upon reviewing the disclosure herein. Such variations, if within the scope of this invention, are intended to be encompassed within the scope of any claims to patent protection issuing hereon. The description of the present embodiment set forth herein is done so for illustrative purposes only.

I claim:

1. A portable hanger for a personal item comprising:
a first portion and a second substantially identical portion, each said portion having two opposing long sides and two opposing short sides;
a band having a first end attached to a first one of said short sides of said first portion and a second end attached to a first one of said short sides of said second portion;
said structure being folded at said band and aligning said first and said second portions, said band forming a loop;
a stitching attaching said first and said second portions and extending along a length of said two respective opposing long sides of said portions and along said respective first one of said short sides of said portions, said stitching spaced from said two respective opposing long sides of said portions and said respective first one of said short sides of said portions, said stitching having a first end and a second end proximate a second one of said short sides of said portions; whereby said portions and said stitching form a pouch;
said first and said second portions each having a first aperture and a second aperture proximate said second short sides, said first apertures of said respective portions being in alignment and said second apertures of said respective portions being in alignment, said apertures being located between said first end and said second end of said stitching;
a first magnet placed in said pouch;
a second stitching threaded through said apertures and closing said pouch;
a ring placed in said loop, said ring capable of opening and closing.

2. A portable hanger for a personal item comprising:
a first portion and a second substantially identical portion, each said portion having two opposing long sides and two opposing short sides;
a band having a first end attached to a first one of said short sides of said first portion and a second end attached to a first one of said short sides of said second portion;
said structure being folded at said band and aligning said first and said second portions, said band forming a loop;
a stitching attaching said first and said second portions and extending along a length of said two respective opposing long sides of said portions and along said respective first one of said short sides of said portions, said stitching spaced from said two respective opposing long sides of said portions and said respective first one of said short sides of said portions, said stitching having a first end and a second end proximate a second one of said short sides of said portions; whereby said portions and said stitching form a pouch;
said first and said second portions each having a first aperture and a second aperture proximate said second short sides, said first apertures of said respective portions being in alignment and said second apertures of said respective portions being in alignment, said apertures being located between said first end and said second end of said stitching;
a first magnet and a second magnet placed in said pouch;
a second stitching threaded through said apertures and closing said pouch;
a ring placed in said loop, said ring capable of opening and closing.

* * * * *